(12) United States Patent
Schliwa et al.

(10) Patent No.: US 10,246,191 B2
(45) Date of Patent: *Apr. 2, 2019

(54) PARTITION WALL FOR A VEHICLE CABIN, A MONUMENT ARRANGEMENT IN A CABIN OF A TRANSPORTATION MEANS, AND A TRANSPORTATION MEANS WITH A CABIN ALONG WITH AT LEAST ONE SUCH PARTITION WALL ARRANGED THEREIN

(71) Applicant: Airbus Operations GmbH, Hamburg (DE)

(72) Inventors: Ralf Schliwa, Hamburg (DE); Roland Lange, Hamburg (DE); Horst Becker, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 225 days.

This patent is subject to a terminal disclaimer.

(21) Appl. No.: 14/908,223

(22) PCT Filed: Jul. 29, 2014

(86) PCT No.: PCT/EP2014/066290
§ 371 (c)(1),
(2) Date: Jan. 28, 2016

(87) PCT Pub. No.: WO2015/014850
PCT Pub. Date: Feb. 5, 2015

(65) Prior Publication Data
US 2016/0167784 A1    Jun. 16, 2016

(30) Foreign Application Priority Data
Jul. 30, 2013 (EP) .......... 10 2013 108 121

(51) Int. Cl.
*B64D 11/06* (2006.01)
*B64D 11/00* (2006.01)
*B64D 11/04* (2006.01)

(52) U.S. Cl.
CPC .............. *B64D 11/00* (2013.01); *B64D 11/04* (2013.01); *B64D 11/0691* (2014.12); *B64D 11/0698* (2014.12); *Y02T 50/46* (2013.01)

(58) Field of Classification Search
CPC . B64D 11/00; B64D 11/0023; B64D 11/0046; B64D 11/04; B64D 11/0691; B64D 11/0698
See application file for complete search history.

(56) References Cited

U.S. PATENT DOCUMENTS

| | | | | |
|---|---|---|---|---|
| 1,412,367 A | * | 4/1922 | Noack | A47B 5/04 297/14 |
| 4,799,632 A | * | 1/1989 | Baymak | B64D 11/0691 244/122 R |

(Continued)

FOREIGN PATENT DOCUMENTS

| | | |
|---|---|---|
| DE | 37 90 556 C1 | 10/1996 |
| DE | 10 2007 009 278 A1 | 8/2008 |

(Continued)

OTHER PUBLICATIONS

International Searching Authority, International Search Report for International Patent Application No. PCT/EP2014/066290 dated Oct. 14, 2014.

(Continued)

*Primary Examiner* — Tien Q Dinh
*Assistant Examiner* — Michael A. Fabula
(74) *Attorney, Agent, or Firm* — Lorenz & Kopf LLP

(57) ABSTRACT

A partition wall for integration into the vehicle cabin of a transportation means comprises a first surface and a second (Continued)

surface, which are arranged parallel to each other. The first surface comprises at least one recess, which may be filled with an at least regionally flat body designed correspondingly thereto, wherein the body is pivoted to the body by means of a swivelling means and may be brought into a stowed position and use position. The body fills out the accompanying recess when in its stowed position. This yields a multifunctional partition wall that may tangibly increase the comfort and available space on board the transportation means without taking up additional installation space.

16 Claims, 5 Drawing Sheets

(56) References Cited

U.S. PATENT DOCUMENTS

| | | | | |
|---|---|---|---|---|
| 4,913,487 | A * | 4/1990 | Breckel | A47C 9/06 297/14 |
| 9,036,334 | B2 * | 5/2015 | Jaeger | B64D 11/04 108/44 |
| 9,073,640 | B2 * | 7/2015 | Mosler | B64D 11/0023 |
| 9,227,728 | B2 * | 1/2016 | Schimanowski | B64D 11/04 |
| 9,260,190 | B2 * | 2/2016 | Ehlers | B64D 11/06 |
| 9,469,403 | B2 * | 10/2016 | Lange | B64D 11/04 |
| 9,580,176 | B2 * | 2/2017 | Ehlers | B64D 11/00 |
| 9,650,146 | B2 * | 5/2017 | Boenning | B64D 11/0691 |
| 2005/0087650 | A1 * | 4/2005 | Quan | B64D 11/06 244/118.6 |
| 2006/0060704 | A1 * | 3/2006 | Lavie | A61G 3/001 244/118.5 |
| 2007/0035919 | A1 * | 2/2007 | Doebertin | B64D 11/0015 361/679.08 |
| 2007/0159035 | A1 * | 7/2007 | Mullen | A47B 21/06 312/245 |
| 2011/0114788 | A1 * | 5/2011 | Mosler | B64D 11/0023 244/118.5 |
| 2011/0121134 | A1 * | 5/2011 | Schotte | B64D 11/0023 244/118.5 |
| 2011/0273849 | A1 * | 11/2011 | Jaeger | B64D 11/04 361/725 |
| 2013/0082140 | A1 * | 4/2013 | Ehlers | B64D 11/0007 244/118.5 |
| 2013/0126672 | A1 * | 5/2013 | Weitzel | B64D 11/06 244/118.6 |
| 2013/0313365 | A1 * | 11/2013 | Ehlers | B64D 11/06 244/118.6 |
| 2014/0209741 | A1 * | 7/2014 | Boenning | B64D 11/06 244/118.6 |
| 2014/0217239 | A1 * | 8/2014 | Ehlers | B64D 11/02 244/118.5 |
| 2014/0224931 | A1 * | 8/2014 | Weitzel | B64D 11/06 244/118.6 |
| 2014/0252830 | A1 * | 9/2014 | Johnson | B64D 11/06 297/337 |
| 2015/0069179 | A1 * | 3/2015 | Ehlers | B64D 11/04 244/118.5 |
| 2015/0069891 | A1 * | 3/2015 | Schimanowski | B64D 11/04 312/242 |
| 2015/0097399 | A1 * | 4/2015 | Vue | B60N 2/3045 297/180.1 |
| 2015/0251762 | A1 * | 9/2015 | Ehlers | B64D 11/06 244/118.6 |

FOREIGN PATENT DOCUMENTS

| | | |
|---|---|---|
| DE | 10 2007 029 677 A1 | 1/2009 |
| DE | 10 2008 031 021 A1 | 1/2010 |
| DE | 10 2010 013 330 A1 | 10/2011 |
| DE | 10 2011 122 061 A1 | 6/2013 |
| DE | 10 2012 003 713 A1 | 8/2013 |
| FR | 2917376 A1 | 12/2008 |
| FR | 2929244 A1 | 10/2009 |
| JP | h10157566 A | 10/1998 |
| WO | 01/30639 A1 | 5/2001 |
| WO | 2011101385 A2 | 8/2011 |

OTHER PUBLICATIONS

German Patent Office, German Search Report for German Patent Application No. 10 2013 108 121.5 dated May 16, 2014.

* cited by examiner

PARTITION WALL FOR A VEHICLE CABIN, A MONUMENT ARRANGEMENT IN A CABIN OF A TRANSPORTATION MEANS, AND A TRANSPORTATION MEANS WITH A CABIN ALONG WITH AT LEAST ONE SUCH PARTITION WALL ARRANGED THEREIN

CROSS-REFERENCE TO RELATED APPLICATIONS

This is a continuation of International Application No. PCT/EP2014/066290, filed Jul. 29, 2014, which application claims priority to European Application No. 10 201 108 121.5, filed Jul. 30, 2013, which are hereby incorporated by reference in their entirety.

TECHNICAL FIELD

The embodiments herein relate to a partition wall for integration into a cabin of a transportation means, a monument arrangement in a cabin of a transportation means, and a transportation means with a cabin along with at least one such partition wall arranged therein.

BACKGROUND

In addition, other objects, desirable features and characteristics will become apparent from the subsequent summary and detailed description, and the appended claims, taken in conjunction with the accompanying drawings and this background.

When setting up passenger cabins, an essential objective is often to maximize the available number of passenger seats, which is limited by the number of prescribed seats for crewmembers, and by prescribed safety installations, utility installations and toilets. The economic viability of an aircraft, for example, also depends on the ratio between the number of passenger seats and other installations. Apart from elementary installations like vehicle attendant seats and toilets, providing a desired comfort level also requires that beverages and meals for the passengers be carried on board a transportation means. The space this takes up should place as little restriction as possible on the space available to the passengers, so that the highest number of passengers may be transported while still providing a certain level of comfort.

WO 2011/101385 A1 shows an especially space-saving toilet arrangement for a transportation means with a first toilet room, a second toilet room adjacent thereto, and a partition wall located between the first toilet room and second toilet room, wherein the partition wall is movably mounted and set up to be moved into an open position in which a separation between the first toilet room and second toilet room is eliminated. Despite the limited construction volume, two relatively small toilet rooms may thereby be converted into a larger toilet room suitable for use by individuals with limited mobility.

SUMMARY

It is an object to provide a passenger cabin in a transportation means so as to make the installation space for necessary devices even more compact in order to increase the space available for passengers.

This object is achieved by a partition wall for integration into the cabin of a transportation means. Advantageous embodiments and further developments may be gleaned from the claims and following description.

Proposed is a partition wall for integration into the cabin of a transportation means that comprises a first surface and a second surface arranged parallel to each other, wherein the first surface has at least one recess is Tillable with an at least in some regions flat body designed correspondingly thereto. The body is secured to the partition wall so that it is pivotable by way of a swivelling means, and is bringable into a stowed position and use position. When in its stowed position, the body fills out the accompanying recess.

As opposed to the partition walls common in prior art in the cabins of transportation means, which are spaced a certain distance away from door areas or monuments, for example galleys, and configured as a flat, single piece, the partition wall according to the embodiment is a multifunctional partition wall able to perform any other functions desired aside from the actual partition wall function. In conceiving the partition wall according to the embodiment, it is assumed that the second surface faces a passenger area with passenger seats, while the first surface faces a cabin monument, a door area, a stair or the like, i.e., cabin areas that are not primarily used by passengers during normal operation of the transportation means. It is especially preferred that the visible part of the second surface comprise a uniform, closed and flat surface, which may be equipped with passenger-related devices if so desired. Examples include screens for an onboard entertainment system (in-flight entertainment, IFE), baby tubs or even just magazine holders. By contrast, the first surface may be equipped with a large number of various devices, which are to be pivoted to the partition wall. In this way, additional functions otherwise intended only for other monuments may be installed in the most compact space possible, and stowed in a space-saving manner on the wall when not in use. In particular, the body may be shaped like a plate, which has contours adjusted to serve a specific purpose, and may be positioned at a suitable height.

The swivelling means may include a first swivelling means and a second swivelling means, wherein the first swivelling means may be situated on the respective body, and the second swivelling means may be situated on the partition wall or recess. The first and second swivelling means then comprise a hinge, and permit a pivoting around a hinge axis determined by this hinge. It is of course possible to have other swivelling means that realize a different type of pivoting with rotary and/or translational moving portions.

In an particularly preferred embodiment, the body fills out the accompanying recess in a flush manner when in its stowed position. As a result, the first surface is preferably completely even or smooth.

Furthermore, the partition wall may also comprise at least one locking means, which is set up to securely hold the body in the accompanying recess when in the stowed position. The locking means may comprise positive and non-positive devices that permit a reliable connection at the loads to be expected during operation of the transportation means, which stem in particular from inertial forces. Examples include latches, clips, catches, clamps and Velcro fasteners.

In a preferred embodiment, the first surface of the partition wall comprises a first recess and an accompanying first body is a swivelling tabletop situated in the first recess. The partition wall further comprises at least one locking means for retaining the tabletop in a stowed position. If needed, a table, for example one that serves a vehicle attendant, may be provided by detaching the at least one locking means and swivelling the tabletop out of a stowed position into a use position. In the stowed position, the tabletop is preferably arranged flush in its recess, and may be held in this position by the at least one locking means. The first surface of the partition wall is preferably completely even and smooth in this stowed position. As a result, integrating the tabletop into the partition wall by swivelling it back into the stowed position does not impede individuals who are present/working in or passing through an area facing the first surface of the partition wall. Tabletop integration requires no additional installation space on other monuments, and thus constitutes an especially space-saving way of providing an additional useful function.

In an advantageous embodiment, the tabletop is pivotable around a hinge line on the first surface of the partition wall, wherein the hinge line is preferably horizontally aligned. The tabletop assumes the table function by simply being swivelled out of a perpendicular position around the hinge line into a horizontal position. Of course, the height of the hinge line may also be selected based on ergonomic criteria. Given a more complex configuration of the swivelling means, however, the hinge line may also be aligned vertically or at a general angle relative to the horizontal if a sequence of several rotational pivoting motions is possible. For example, the tabletop could first be rotated around a vertical swivelling axis, and subsequently be rotated around a horizontal swivelling axis situated perpendicular to the first surface. The at least one locking means should then be capable of also detachably blocking the horizontal position.

In addition, it may be beneficial to arrange at least one locking means on a side of the first recess lying opposite the hinge line. As a result, a reliable retaining function for the tabletop may be achieved at the lowest possible holding force and utilizing the greatest possible distance from the hinge line.

It is further preferred that a retaining support that supports the tabletop in the use position be located at a position of the tabletop spaced apart from the hinge line. The retaining support is thereby preferably pivoted to the tabletop, and may assume a perpendicular alignment relative to the tabletop. If the tabletop is perpendicular to the partition wall in the use position, a properly dimensioned retaining support may allow a secure footing on the cabin floor in a perpendicular position relative to the tabletop.

The hinge line for the tabletop may be oriented in such a way as to reach the usual working height, which ranges between about 70 and 80 cm from the cabin floor. However, the height may also be varied by allocating the tabletop and/or first surface of the partition wall according to the embodiment to a vehicle attendant seat situated on a monument lying opposite the partition wall. The height of the hinge line for the tabletop should then be adjusted to the seat height of the respective vehicle attendant seat.

In an advantageous embodiment, a second body is a seating surface pivotably arranged around a hinge line on the first surface of the partition wall and bringable from a stowed position into a use position. The seating surface could here be configured similarly to the tabletop described above, and is allocated to a second recess on the first surface. The respective hinge line is preferably horizontally arranged, and thus makes it possible to stow the seat with which a seating surface may be created in a vertical position, and swivel the seating surface into a horizontal position for use.

Since a seating surface is usually subjected to a higher load than a tabletop, it may also be advantageous to pivot at least one retaining support to the seating surface. When the seating surface is swivelled out of a vertical stowed position into a horizontal use position, the retaining support of the seating surface may be folded out, so that the seating surface is securely held between the hinge line and retaining support in a horizontal position. Alternatively or additionally, the seating surface is situated in a frame, which introduces the load as uniformly as possible into the partition wall.

The partition wall according to the invention preferably comprises both a pivotably supported tabletop and a pivotably supported seating surface. As a consequence, a seat and table may be provided when necessary out of a smooth, even partition wall, for example which may be utilized by personnel inside the transportation means during breaks or to make notes.

In just as advantageous an embodiment, a third body is designed as a swivelling clamp mounting for retaining objects that are positionable on the first surface, which fills a third recess when in the stowed position. A lockable or retainable object has an upper surface onto which the clamp mounting may be swivelled or folded open. As a consequence, the height of this upper surface should correspond with the height of a lower surface of the clamp mounting, so that clamping may take place. It may be advantageous for the clamp mounting to comprise an elasticity that allows a secure retention of objects that run under the lower surface of the clamp mounting and have a certain height tolerance. For example, if the object to be retained is a bit too high, the elasticity of the clamp mounting allows it to also be swivelled or folded onto the upper surface of the object. It is further advantageous to arrange a compressible body on the lower side of the clamp mounting, which is compressed when applied to the upper surface of the object, and improves the retention of the object due to the repelling force caused by the compression. It especially makes sense to provide a body comprised of an elastic material for this purpose, for example an elastomer like rubber, gum elastic, or silicone. It may also make sense to provide a retaining plate, which may be placed on the object to be retained and subsequently fixed in place with a locking device.

The clamp mounting is especially suited for at least temporarily retaining trolleys on the partition wall according to the invention, for example when a galley module with a highly compact configuration and the capacity to store several trolleys situated one behind the other in a mounting shank requires that a trolley be removed from a mounting shank and be temporarily stored for a short time at another location.

In another embodiment, the partition wall may comprise at least one cut-out, as well as at least one storage compartment that corresponds with the cut-out, is situated on the second surface of the partition wall and is accessible from the first surface by way of the cut-out. The partition wall in the cabin of a transportation means may extend from a floor up to ceiling area, and thus also cover those areas not accessible to passengers in the transportation means. Let it be noted strictly by way of example that overhead storage compartments may be situated above the passenger seats and be used for luggage, utensils or oxygen tanks. A cut-out in the partition wall according to the invention could be located in an area that borders a storage compartment or a cover panel that adjoins a storage compartment, for example. A storage compartment accessible from the first surface could here be provided, which is used in particular by personnel on board the transportation means. For example, emergency equipment may be integrated in a flush manner instead of being bolted to or on the wall. The cut-out through which the storage compartment is accessible may be designed as an orifice to which a sealing cap may be secured to closet the storage compartment.

The partition wall may basically be fabricated out of any material. However, the ability to provide a certain thickness is advisable to ensure the various functions, so that a tabletop or other pivoted devices close flush with the first surface of the partition wall when in a stowed position. A lightweight structure lends itself precisely to integration into transportation means and in particular into aircraft, for example realized as a sandwich design, and apart from cover layers with an interspersed core layer may also comprise a frame structure with a lattice-like frame lying on the inside. In particular in framework designs, it is recommended that the contours of the respective recesses be surrounded by frame components so as to ensure the greatest possible strength. Precisely during the integration of a seating surface, the load introduced by the seating surface may be ideally introduced into the partition wall in this way. When configuring the second surface of the partition wall, it makes sense to use a continuous cover layer that closes off any recesses on the first surface. During the integration of hinge elements into honeycomb layers, local reinforcement should be ensured via a frame component or by incorporating a larger-surface component preferably consisting of a massive material.

The embodiments described herein further relate to a monument arrangement in a transportation means. The monument arrangement comprises a partition wall described above along with a monument facing the first surface of the partition wall and spaced apart from the latter, for example which may be designed as a cooking monument or toilet, alternatively as a modular monument with kitchen and/or toilet modules as well. It is especially preferred that the monument comprise a vehicle attendant seat, the seating surface of which may swivel. The vehicle attendant seat is preferably located in an area of the monument that faces the tabletop of the partition wall that may swivel out. This is intended to ensure that a vehicle attendant who sits down on the vehicle attendant seat secured to the monument may take a seat at the tabletop secured to the partition wall when folded out. A swivelling seating surface on the partition wall should further be spaced laterally apart from the optionally present seating surface. It is especially preferred that the monument comprise at least one parking space for a trolley, which may be taken out of the parking space and retained under a clamp mounting pivoted to the partition wall. It is especially preferred that the monument arrangement according to the invention encompasses a galley monument with at least one storage compartment, and oppositely thereto a partition wall according to the invention.

The embodiments further relate to a transportation means with a cabin and a partition wall situated therein, wherein a monument arrangement of the kind described above is preferably included. The transportation means is here in particular a commercial aircraft.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
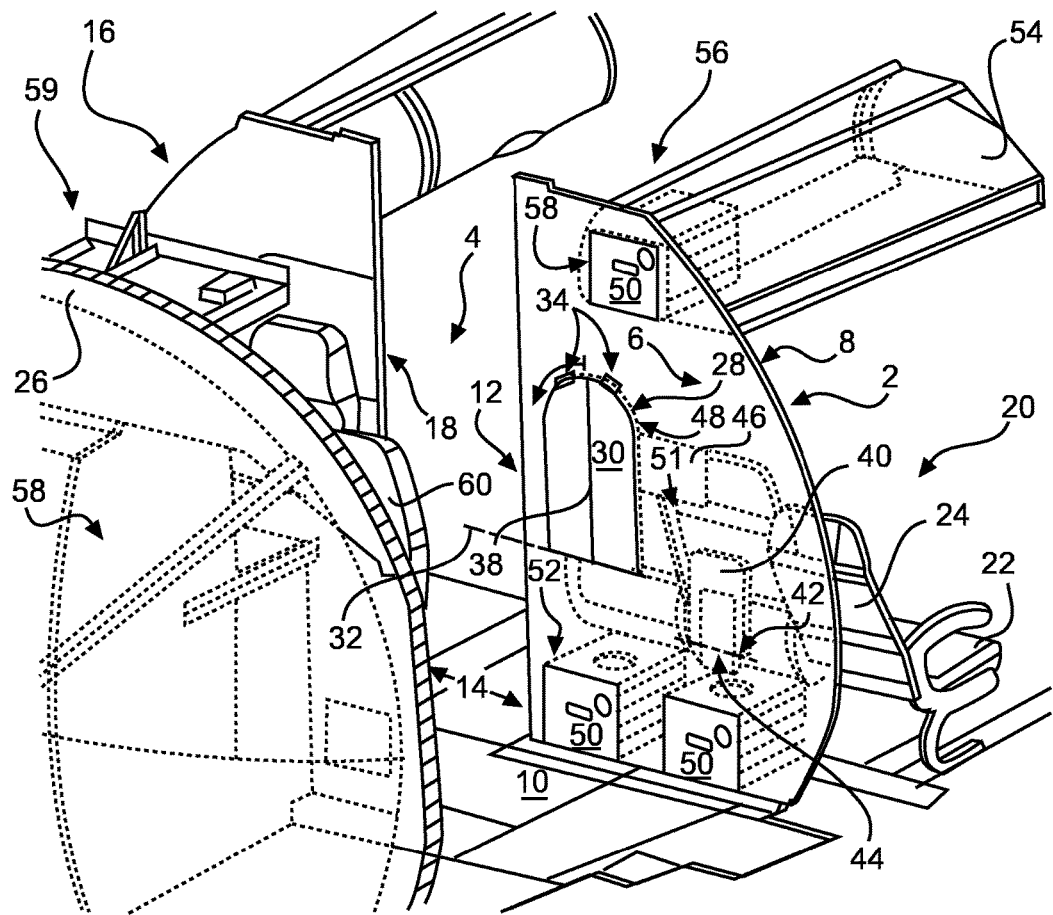
FIG. 1 is a three-dimensional view of a partition wall in the cabin of a transportation means.

FIG. 1 shows a partition wall 2 in the cabin 4 of a transportation means. The partition wall 2 comprises a first surface 6 and a second surface 8, which are arranged parallel to each other. While the first surface 6 is clearly discernible in the drawing plane, the second surface 8 is covered in this case. The partition wall 2 is located on the floor 10, where it is anchored by suitable means, and extends perpendicularly into the cabin 4. A perpendicular bordering edge 12 bounds the partition wall 2 in a horizontal direction, and there bounds a passage 14. Situated in a laterally opposite position at the passage 14 is a second partition wall 16, which also comprises a lateral bordering edge 18 that bounds the other side of the passage 14. The partition wall 16 may correspond to the partition wall 2. The edges of the partition walls 2 and 16 spaced apart from the passage 14 are preferably adjusted to the inner contour of the cabin 4 in the transportation means.

The partition wall 2 is situated in the cabin 4 in such a way as to close off a passenger area 20 in a longitudinal direction in the cabin 4. Therefore, the second surface 8 is oriented toward the passenger seats 22. The distance away from the passenger seats 22 is selected in such a way that backrests 24 may be swivelled into a relaxed, semi-prone position. Let it here be noted that, while the second surface 8 points toward the backrests 24 of the passenger seats 22 in the example shown, a configuration in which the second surface 8 is directed toward the front side of the passenger seats 22 would also be possible. However, the example shown now relates to the rear area of an aircraft, as evident from the partially depicted pressure bulkhead 26, which bounds the usually pressurized cabin 4 in a commercial aircraft from the rear.

The special feature of the partition wall 2 lies in the fact that it not just acts as a partition wall, but also performs other functions usually not handled by partition walls. The first surface 6 comprises a first recess 28 in which a first body is situated in the form of a tabletop 30 and may be swivelled by way of a hinge line 32. For this purpose, the tabletop 30 comprises first swivelling means, which engages into second swivelling means on the first surface 6, and thereby forms a kind of hinge. The resultant hinge axis 32 is horizontally situated, so that the tabletop 30 may be folded from an essentially perpendicular stowed position into an essentially horizontal use position. Located at an end of the first recess 28 remote from the hinge line 32 are locking means 34, which are designed as latches or the like. Arranged between the two locking means 34 is a hinge 36 bearing a retaining rod 38. With the tabletop 30 folded out, the retaining rod 38 may reliably support the end of the tabletop 30 facing away from the hinge line 32 on the floor 10.

When in the stowed position, the tabletop 30 is flush with the second surface 6, so that it does not influence how the area in front of the second surface 6 is used in any way.

Nevertheless, the additional function of the tabletop 30 ensures that valuable installation space is not wasted anywhere.

For example, the first surface 6 accommodates a second body in the form of a seating surface 40, which may also be swivelled out of a second recess 44 via a horizontal hinge line 42. The height of the hinge line 42 measured from the floor 10 is less than the height of the hinge line 32, so that the tabletop 30 may be used when sitting on the seating surface 40. Given the higher load on the seating surface 40 when used by an individual, the seating surface 40 may be embedded into a frame 62 fixedly integrated into the partition wall 2 (see further below), and/or comprise an outwardly folding or telescoping retaining support, which just as the retaining support 38 of the tabletop 30 provides a reliable support on the floor 10 or frame 62.

Further depicted is a clamp mounting 46 that is exemplarily situated right next to the tabletop 30 in a third recess 47, and may pivot at least partially around a perpendicular hinge axis 48. The objective of this clamp mounting 46 is to clamp an object that may be positioned flush against the first surface 6 and comprises a height making it possible to slide or clamp on a lower edge 51 of the clamp mounting 46. As will be described further below, the clamp mounting may be enhanced by a retaining plate 68 that may swivel around a horizontal hinge line. Relative movements by the object may be reliably prevented by the clamp mounting 46, for example so that a trolley or the like may temporarily be left under the clamp mounting 46 against the partition wall 2, and the trolley may be prevented from inadvertently moving away.

The alignment toward the backrests 24 of the passenger seats 22 easily makes it possible to provide a stowage space in the form of standardized storage compartments 50 at a lower end of the partition wall 2. To this end, the first surface 6 comprises cut-outs 52 through which the storage compartments 50 may be reached. The latter extend under the backrests 24 of the passenger seats 22, and have absolutely no effect on how the passenger seats are used. For example, two standardized storage compartments 50 are located at a lower end of the partition wall 2.

Since the partition wall 2 in the cabin 4 may extend from a floor 10 to a ceiling cover panel (not shown), it may also be used as a lateral boundary for overhead storage compartments 54 or their adjoining cover panels 56. For example, the first surface 6 incorporates another cut-out 58 leading to another standardized storage compartment 50, which is situated at an upper end of the partition wall in a cover panel 56 adjacent to an overhead storage compartment 54. As a result, a partition wall 2 permits the accommodation of three standardized storage compartments. More storage compartments may be used depending on the expanse of the cabin 4.

As evident from the depiction on FIG. 1, the first surface 6 has facing it a monument 59, on which is positioned an attendant seat 60, for example one that may swivel. The position selected for the tabletop 30 on the partition wall 2 is such that the tabletop 30 may be used from the attendant seat 60 when folded out. Combined with the foldout seating surface 40, two attendants may thus use a tabletop together without even taking up additional installation space. By comparison to known configurations of monuments and partition walls, this is highly advantageous, since the worktops in a kitchen module would otherwise be diverted from their intended use, and could impede ongoing operations there. In addition, the level of comfort for attendants on board a transportation means is clearly improved, since enough space for shorter breaks is provided.

Figure 2:
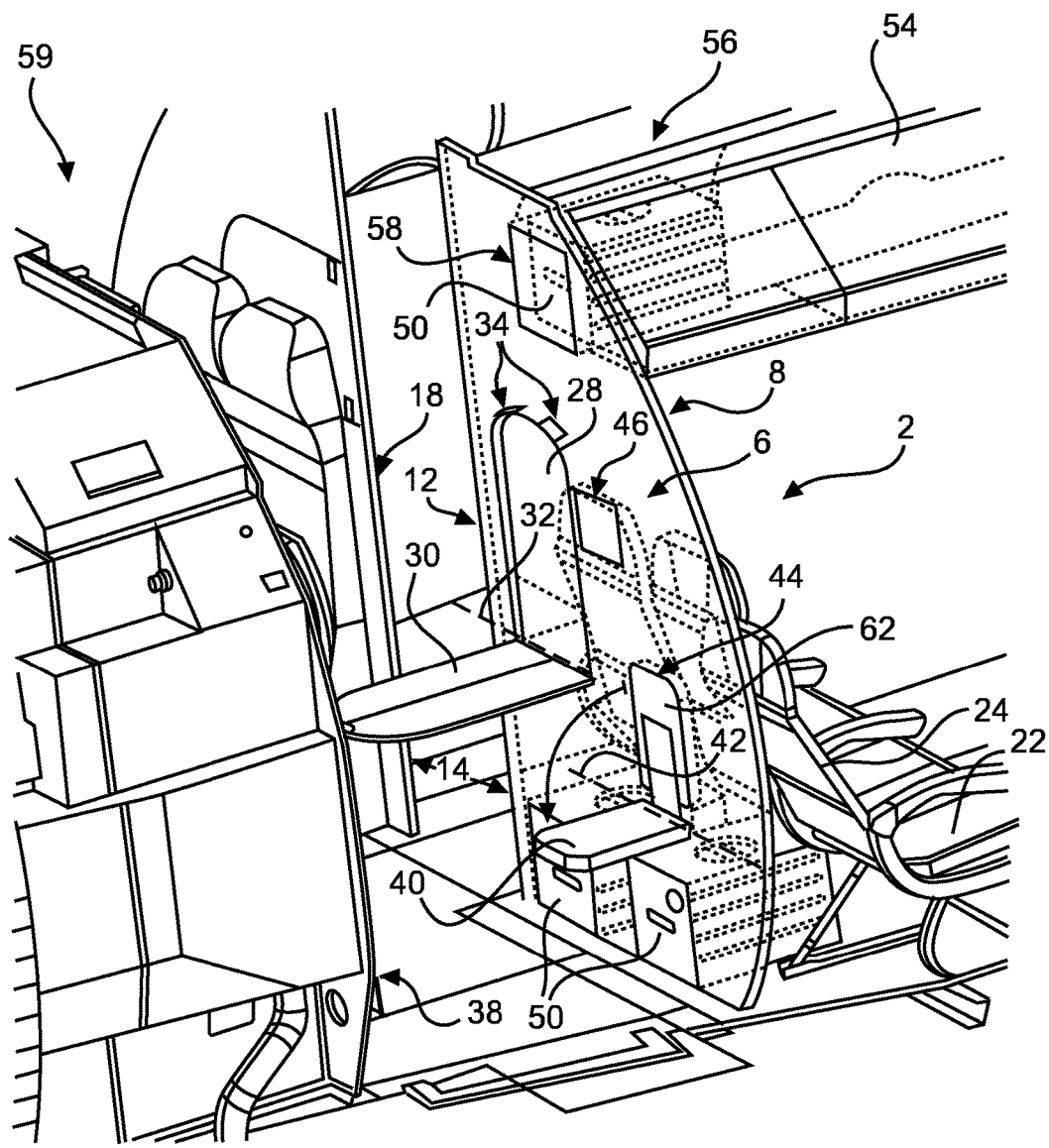
FIG. 2 is a three-dimensional view of a partition wall with folded out seating surface and folded out tabletop.

FIG. 2 shows a folded out seating surface 40 along with a folded out tabletop 30 from a somewhat modified perspective. The retaining support 38 in this depiction may still be discerned at least at the lower end, and demonstrates that the tabletop 30 is securely held in place, being supported on the floor 10. Also visible is that the seating surface 40 is arranged on a stable frame 62, which is flatly integrated into the recess 44 of the partition wall 2. For example, the partition wall 2 may consist of a frame structure (not shown), which is integrated into the frame 62 of the seating surface 40. As a result, especially advantageous loads may be introduced from the vehicle attendant seat 40 into the partition wall 2.

Figure 3:
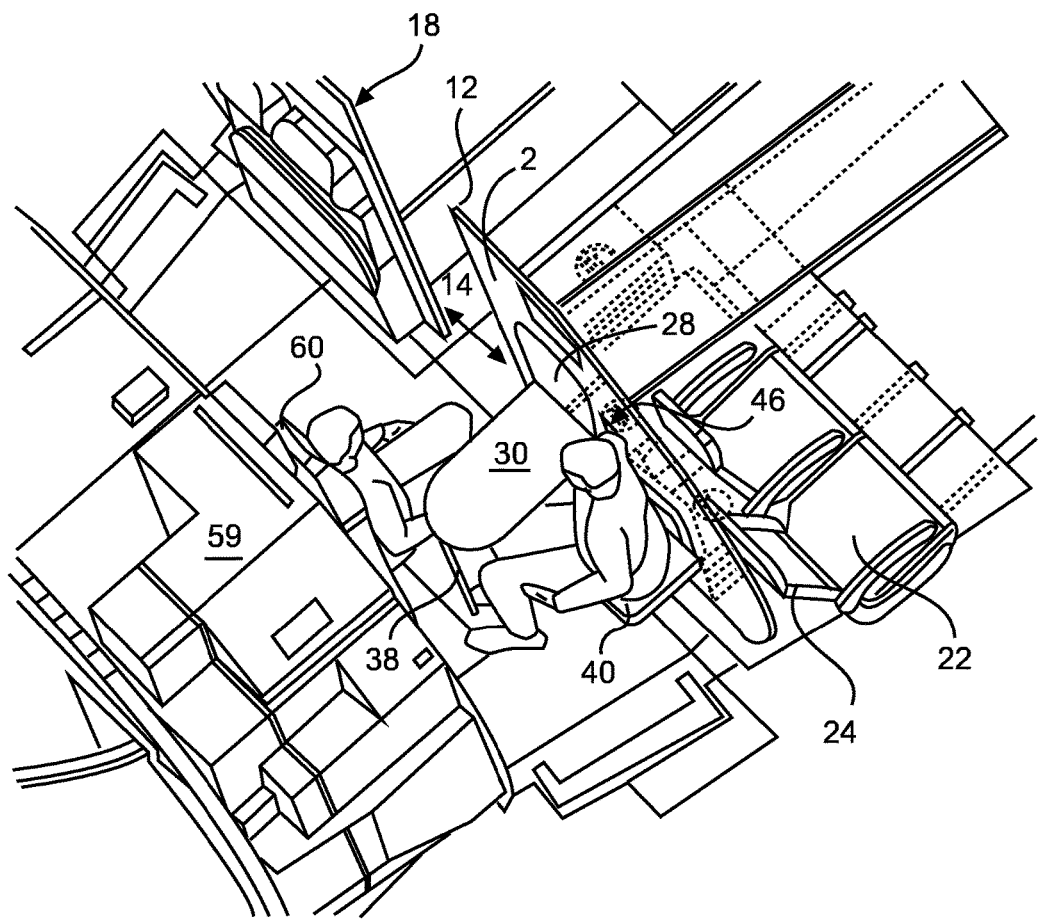
FIG. 3 shows two individuals in the cabin of a transportation means on a folded out seating surface, on a vehicle attendant seat and at a folded out tabletop.

FIG. 3 shows how two individuals sitting on the vehicle attendant seat 60 and seating surface 40 use the tabletop 30, also from a modified perspective. The tabletop 30 is here dimensioned in such a way that both individuals may very easily use it at the same time. As also evident from the depiction, even though the narrow gap between the monument 59 and partition wall 2 wastes no space, an especially comfortable spot may still be provided for breaks or seated activities.

Figure 4A:
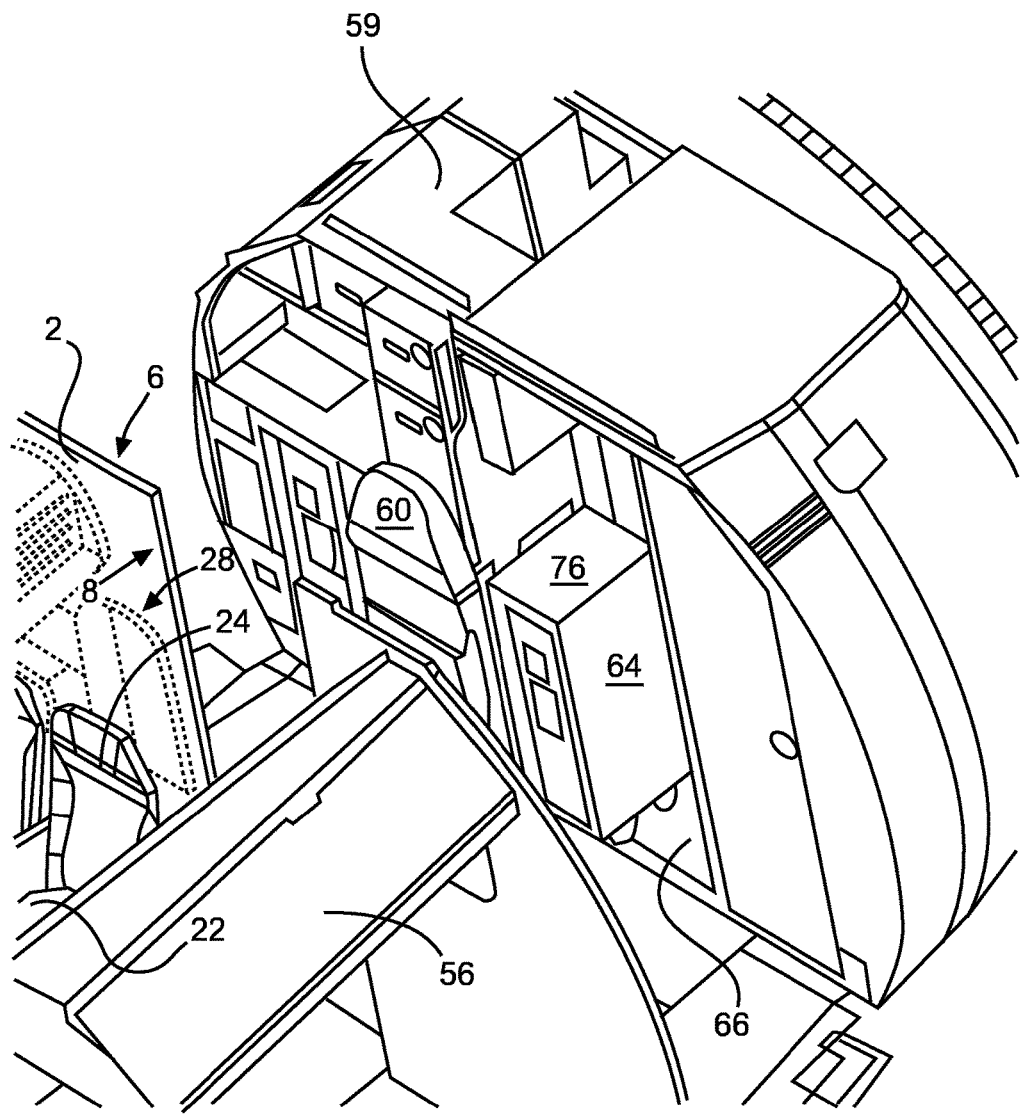
FIG. 4A and FIG. 4B show a monument with trolley located therein, and a trolley secured to the partition wall with a clamp mounting.
Figure 4B:
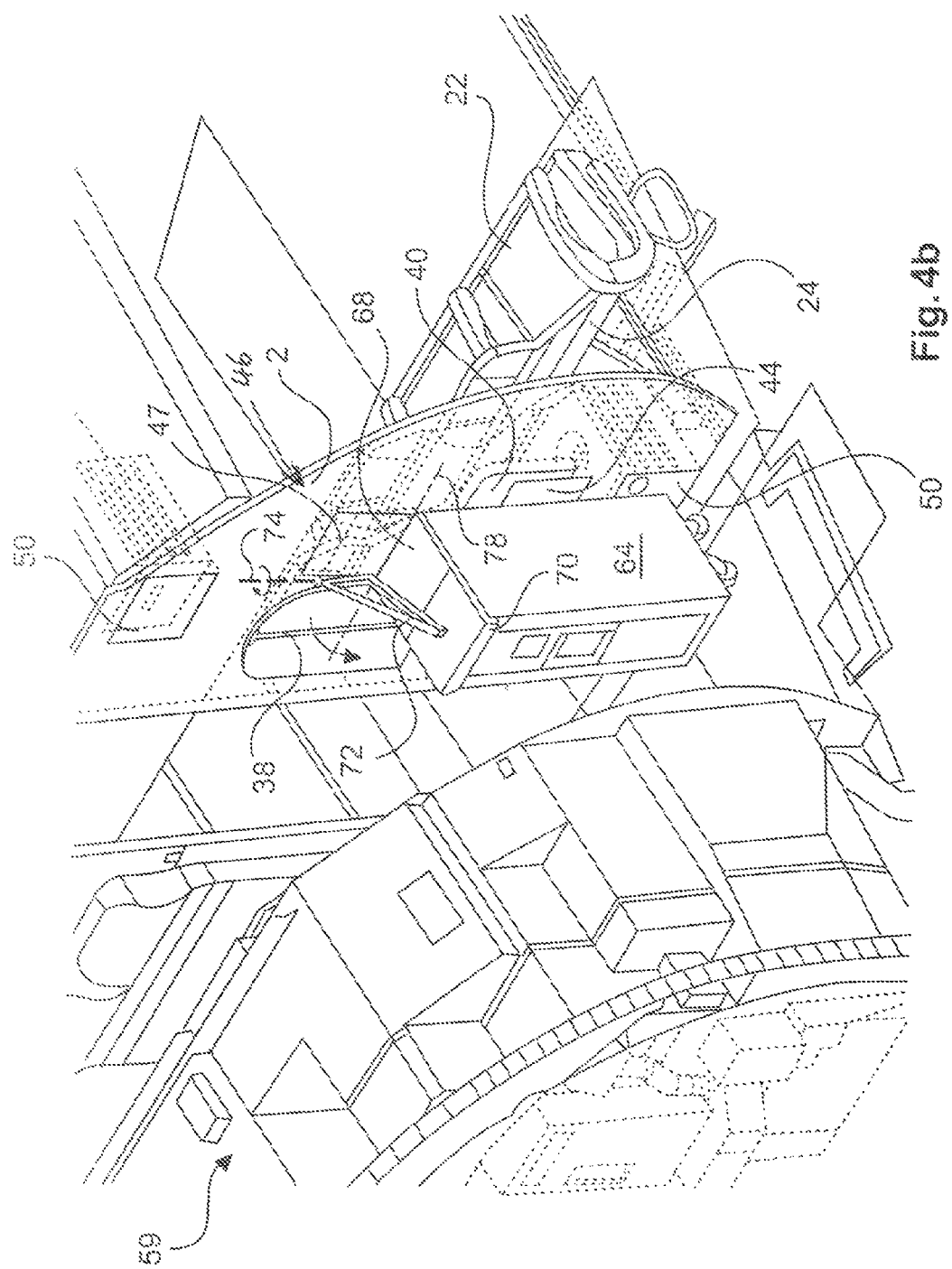

Finally, FIGS. 4A and 4B show the use of the partition wall 2 for temporarily retaining a trolley 64 that is located in the monument 59, but must be temporarily stowed on the partition wall 2 to free up a space lying behind it. FIGS. 4A and 4B show two different perspectives for this purpose.

FIG. 4A shows the trolley 64, which is arranged in a receiving space 66 of the monument 59. This trolley 64 is parked in this position only during flight phases in which no access to the toilets is allowed, i.e., during turbulence. In the case of turbulence, it is important to secure the trolley 64 as quickly as possible. The function makes sense, since the trolley 64 might here be one from another galley for which no storage space is provided in the galley depicted. During turbulence, it might not be possible to move the trolley directly to the accompanying galley, so that the trolley may be reliably secured until the turbulence has passed.

FIG. 4B shows the clamp mounting 46, which consists of a clamping plate 68 that may be accommodated in the third recess and comprises a downwardly directed protrusion 70, which extends over the trolley 64, and of a locking device 72 that may be essentially horizontally swivelled around a hinge axis 74 and in so doing presses the clamping plate 68 onto an upper surface 76 of the trolley 64. As also apparent from FIG. 4b, the clamping plate 68 may be swiveled about the horizontal hinge axis 78. As a result, the trolley 64 may be reliably held in its current position, and not drift away from the partition wall 2, whether laterally or in the longitudinal direction.

Therefore, the partition wall 2 according to the embodiment is an especially advantageous, multifunctional partition wall that tangibly increases the comfort and available space on board a transportation means. As a result, especially favorable configurations of monuments and a partition wall may be provided in a transportation means, leading to a substantial upgrade to the cabin.

In addition, let it be noted that "comprises" does not preclude any other elements or steps, and that "a" or "an" does not rule out a plurality. Let it further be noted that features described with reference to one of the above exemplary embodiments may also be used in combination with other features in other exemplary embodiments described above. References in the claims are not to be construed as a limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A partition wall for integration into a cabin of a transportation means, comprising:
    a first surface;
    a second surface, arranged in parallel to the first surface;
    a first flat body having a flat region; and
    a vehicle attendant seat;
    wherein the first surface comprises a first recess and a second recess;
    wherein the flat body is pivoted around a horizontal hinge line to the first surface by a swiveling means and is movable between a stowed position and a use position;
    wherein the flat body fills out the first recess when in the stowed position;
    wherein the vehicle attendant seat is pivoted around a seat hinge line between a stowed seat position and a seating position;
    wherein the vehicle attendant seat fills the second recess when in the stowed seat position; and
    wherein the flat body has a working height adapted to the vehicle attendant seat.

2. The partition wall of claim 1, wherein the flat body is flush with the first surface of the partition wall when in the stowed position.

3. The partition wall of claim 1, further comprising at least one locking means for retaining the flat body in the stowed position.

4. The partition wall of claim 3, wherein the at least one locking means is arranged on the side of the first recess.

5. The partition wall of claim 3, wherein the at least one locking means is arranged on a side of the first recess lying opposite the hinge line.

6. The partition wall of claim 1, further comprising a retaining support that is located at a position spaced apart from the hinge line and designed to support the flat body in the use position.

7. The partition wall of claim 1, wherein a second vehicle attendant seat is situated on a monument lying opposite the partition wall, and wherein the working height of the flat body is adapted to the second vehicle attendant seat.

8. The partition wall of claim 1, further comprising a clamp mounting for retaining objects that are positionable on the first surface, wherein the clamp mounting is clampable onto a surface of the object.

9. The partition wall of claim 1, further comprising:
    at least one cutout; and
    at least one storage compartment corresponding with the cutout, wherein the storage compartment is situated on the second surface of the partition wall, and is accessible from the first surface by way of the cutout.

10. A monument arrangement in a transportation means, comprising:
    a partition wall of claim 1; and
    at least one monument that faces the first surface of the partition wall and is spaced apart from the partition wall.

11. The monument arrangement of claim 10, comprising:
    a vehicle attendant seat on the monument, wherein the vehicle attendant seat includes a seating surface which is swivelable and which faces the first surface of the partition wall in a seat use position.

12. The monument arrangement of claim 10, comprising:
    at least one parking space for a trolley, and
    a clamp mounting pivoted to the partition wall for retaining the trolley.

13. A transportation means comprising:
    a cabin; and
    a partition wall of claim 1 situated in the cabin.

14. The transportation means of claim 13, further comprising a monument arrangement.

15. A partition wall for integration into a cabin of a transportation means, comprising:
    a first surface;
    a second surface arranged in parallel to the first surface;
    a tabletop having a flat region;
    a storage compartment;
    wherein the first surface comprises a first recess;
    wherein the partition wall is formed with an orifice located below the first recess and extending from the first surface to the second surface;
    wherein the tabletop is pivoted around a horizontal hinge line to the first surface by a swivelling means and is movable between a stowed position and a use position;
    wherein the tabletop fills the first recess when in the stowed position;
    wherein the storage compartment is located in and extends through the orifice and past the second surface and is accessible from the first surface.

16. A partition wall for integration into a cabin of a transportation means, comprising:
    a first surface and a second surface arranged in parallel to the first surface;
    a clamping mounting including a clamping plate and a locking device;
    wherein the first surface comprises a first recess;
    wherein the clamping mounting fills the first recess when in the stowed position;
    wherein the clamping plate is pivotably movable from the first recess to a clamping position;
    wherein the clamping plate is adapted to contact and retain a trolley adjacent the first surface when in the clamping position;
    wherein the locking device is pivotably movable from the first recess to a locking position; and
    wherein the locking device presses the clamping plate onto the trolley when in the locking position.

* * * * *